US011567885B2

(12) United States Patent
Shah et al.

(10) Patent No.: US 11,567,885 B2
(45) Date of Patent: Jan. 31, 2023

(54) SYSTEM AND METHOD FOR OPTIMIZING DRAM BUS SWITCHING USING LLC

(71) Applicant: LG ELECTRONICS INC., Seoul (KR)

(72) Inventors: Milan Shah, San Jose, CA (US); Tariq Afzal, San Jose, CA (US); Thomas Zou, San Jose, CA (US)

(73) Assignee: LG ELECTRONICS INC., Seoul (KR)

( * ) Notice: Subject to any disclaimer, the term of this patent is extended or adjusted under 35 U.S.C. 154(b) by 874 days.

(21) Appl. No.: 16/301,141

(22) PCT Filed: May 12, 2017

(86) PCT No.: PCT/KR2017/004976
§ 371 (c)(1),
(2) Date: Nov. 13, 2018

(87) PCT Pub. No.: WO2017/196142
PCT Pub. Date: Nov. 16, 2017

(65) Prior Publication Data
US 2021/0271610 A1  Sep. 2, 2021

Related U.S. Application Data

(60) Provisional application No. 62/335,652, filed on May 12, 2016.

(51) Int. Cl.
*G06F 13/16* (2006.01)
*G06F 12/0875* (2016.01)
(Continued)

(52) U.S. Cl.
CPC ........ *G06F 13/1673* (2013.01); *G06F 3/0658* (2013.01); *G06F 12/0804* (2013.01);
(Continued)

(58) Field of Classification Search
CPC ............. G06F 13/1642; G06F 12/0875; G06F 2212/1041
(Continued)

(56) References Cited

U.S. PATENT DOCUMENTS

| 5,590,304 A | * | 12/1996 | Adkisson | .................. G06F 5/06 |
| | | | | 711/100 |
| 6,469,982 B1 | * | 10/2002 | Henrion | .............. H04L 12/5602 |
| | | | | 370/395.43 |
| 6,594,234 B1 | * | 7/2003 | Chard | ..................... H04L 47/30 |
| | | | | 370/236 |
| 7,324,536 B1 | * | 1/2008 | Holtey | .................... H04L 47/10 |
| | | | | 370/412 |

(Continued)

OTHER PUBLICATIONS

PCT International Application No. PCT/KR2017/004976, Notification of Transmittal of the International Search Report and the Written Opinion of the International Searching Authority, or Declaration dated Jul. 24, 2017, 14 pages.

*Primary Examiner* — Idriss N Alrobaye
*Assistant Examiner* — Henry W Yu
(74) *Attorney, Agent, or Firm* — Lee Hong Degerman Kang & Waimey

(57) ABSTRACT

The present disclosure relates to a system and method for optimizing switching of a DRAM bus using LLC. An embodiment of the disclosure includes sending a first type request from a first type queue to the second memory via the memory bus if a direction setting of the memory bus is in a first direction corresponding to the first type request, decrementing a current direction credit count by a first type transaction decrement value, if the decremented current direction credit count is greater than zero, sending another first type request to the second memory via the memory bus and decrementing the current direction credit count again by the first type transaction decrement value, and if the decremented current direction credit count is zero, switching the direction setting of the memory bus to a second direction and resetting the current direction credit count to a second type initial value.

24 Claims, 5 Drawing Sheets

(51) Int. Cl.
  *G06F 13/40* (2006.01)
  *G06F 13/42* (2006.01)
  *G06F 12/0804* (2016.01)
  *G06F 3/06* (2006.01)
  *G06F 12/084* (2016.01)
  *G06F 12/0862* (2016.01)
  *G06F 12/0897* (2016.01)
  *G06F 15/78* (2006.01)

(52) U.S. Cl.
  CPC ........ *G06F 12/084* (2013.01); *G06F 12/0862* (2013.01); *G06F 12/0875* (2013.01); *G06F 12/0897* (2013.01); *G06F 13/1642* (2013.01); *G06F 13/40* (2013.01); *G06F 13/4234* (2013.01); *G06F 15/7807* (2013.01); *G06F 2212/1032* (2013.01); *G06F 2212/1041* (2013.01); *G06F 2212/602* (2013.01); *G06F 2212/608* (2013.01); *Y02D 10/00* (2018.01)

(58) Field of Classification Search
  USPC .................................. 710/6, 29, 39, 52, 310
  See application file for complete search history.

(56) References Cited

U.S. PATENT DOCUMENTS

| | | | |
|---|---|---|---|
| 7,675,929 B1 * | 3/2010 | Davis | H04L 47/10 370/412 |
| 8,571,049 B2 * | 10/2013 | Pacella | H04L 49/9094 370/412 |
| 2003/0033461 A1 | 2/2003 | Malik et al. | |
| 2005/0030963 A1 * | 2/2005 | Solomon | H04L 47/39 370/428 |
| 2005/0047421 A1 * | 3/2005 | Solomon | H04L 41/12 370/399 |
| 2006/0126211 A1 | 6/2006 | Sasaki | |
| 2007/0255874 A1 * | 11/2007 | Jennings | G06F 13/1642 710/113 |
| 2008/0046632 A1 | 2/2008 | Belllows et al. | |
| 2009/0019238 A1 | 1/2009 | Allison et al. | |
| 2009/0287889 A1 * | 11/2009 | Abts | G06F 11/106 711/154 |
| 2013/0054901 A1 * | 2/2013 | Biswas | G06F 13/1642 711/154 |
| 2016/0085290 A1 * | 3/2016 | Skandakumaran | G06F 1/3253 713/320 |
| 2016/0359968 A1 * | 12/2016 | Chitti | H04L 67/1095 |

* cited by examiner

| Time (t) | TRANSACTION | CDC | WR/RD Request Count | Bus Direction |
|---|---|---|---|---|
| 0 | Set DIR = RD | 5 (RD) | 3 (RD) | RD |
| 1 | Send 1 RD | 4 | 2 (RD) | RD |
| 2 | Block 1 RD | 2 | 2 (RD) | RD |
| 3 | Send 1 RD | 1 | 1 (RD) | RD |
| 4 | Block 1 RD | 0 | 1 (RD) | RD |
| 5 | Set DIR = WR | 4 (WR) | 4 (WR) | WR |
| 6 | Send 1 WR | 3 | 3 (WR) | WR |
| 7 | Block 1 WR | 1 | 3 (WR) | WR |
| 8 | Send 1 WR | 0 | 2 (WR) | WR |
| 9 | Block 1 WR | 0 | 1 (WR) | WR |
| 10 | Send 1 WR | 0 | 0 (WR) | WR |

FIG 2(b)

| Time (t) | TRANSACTION | CDC | WR/RD Request Count | Bus Direction |
|---|---|---|---|---|
| 0 | Set DIR = RD | 5 (RD) | 3 (RD) | RD |
| 1 | Send 1 RD | 4 | 2 (RD) | RD |
| 2 | Block 1 RD | 2 | 2 (RD) | RD |
| 3 | Send 1 RD | 1 | 1 (RD) | RD |
| 4 | Block 1 RD | 0 | 1 (RD) | RD |
| 5 | Set DIR = WR | 8 (WR)* | 4 (WR) | WR |
| 6 | Send 1 WR | 7 | 3 (WR) | WR |
| 7 | Block 1 WR | 5 | 3 (WR) | WR |
| 8 | Send 1 WR | 4 | 2 (WR) | WR |
| 9 | Send 1 WR | 3 | 1 (WR) | WR |
| 10 | Send 1 WR | 2 | 0 (WR) | WR |
| 11 | Idle Cycle | 0 | 0 (WR) | WR |
| 12 | Set DIR = RD | 5 (RD) | 4 (RD)** | RD |
| 13 | Send 1 RD | 4 | 3 (RD) | RD |

Assumed changes from 2(a) example:
*WR_INIT_REG = 8
**3 new RD requests into LLC Read Queue during t=5-12

FIG 2(c)

of the plurality of second type requests in a second type queue.

SYSTEM AND METHOD FOR OPTIMIZING DRAM BUS SWITCHING USING LLC

CROSS-REFERENCE TO RELATED APPLICATIONS

This application is the National Stage filing under 35 U.S.C. 371 of International Application No. PCT/KR2017/004976, filed on May 12, 2017, which claims the benefit of U.S. Provisional Application No. 62/335,652, filed on May 12, 2016, the contents of which are all hereby incorporated by reference herein in their entirety.

TECHNICAL FIELD

The present invention generally relates to a system and method for optimizing switching of a DRAM bus using LLC.

BACKGROUND ART

A cache memory (or simply "cache") is a relatively small and fast storage system incorporated either inside or close to a processor or between a processor and a main memory which can be realized by and referred to as dynamic random access memory (DRAM). A cache may store instructions or data, which can be quickly accessed and supplied to the processor compared to a relatively slow access time for retrieving the same information from the main memory. Data from the much larger but slower main memory is staged into the cache typically in units of transfer called "lines" or cachelines.

When a request to read data stored in memory is issued by the processor, the cache is checked to determine whether or not the data is already present in the cache. If the data being requested is stored in the cache, the cache provides the data to the processor and main memory does not have to be accessed. If the requested data is not stored in the cache, the requested data has to be fetched directly from main memory. The data from main memory is provided to the processor in response to the request and also stored in the cache in case the same data is requested again. As such, the cache is used to store frequently accessed information and improves the processor performance by delivering requested information faster than accesses to main memory. The cache may also be used to store data which is predicted to be accessed in the future, such as data related to or spatially stored proximate to data that has been fetched from main memory. The cache may also be used to store updated data which is to be written back to the main memory.

With the proliferation of mobile devices such as cell phones, smart phones, tablet computers, and mobile computing devices including laptop devices, increasing requirements for high level computing and power consumption management have led to further integration of several distinct processing aspects into a single microprocessor unit— or system on a chip—including graphics processing, wireless communications processing, and image processing. The deeper level of integration has increased the bandwidth and power requirements of the LLC since more and more processes are required to use the LLC.

Last Level Caches (LLC) have long been employed in system on chip (SOC) implementations to reduce memory latency and reduce system power through the use of spatial and temporal locality. With the proliferation of mobile devices such as cell phones, smart phones, tablet computers, and mobile computing devices including laptop devices, increasing requirements for high level computing and power consumption management have led to further integration of several distinct processing aspects into a single microprocessor unit—or system on a chip—including graphics processing, wireless communications processing, and image processing. The deeper level of integration has increased the bandwidth and power requirements of the LLC since more and more processes are required to use the LLC.

LLCs are typically directly attached to the memory controller (MC) which directly controls the main memory or DRAM chips. DRAM bandwidth is a precious resource that mobile SOC tries to optimize. More efficient usage of the DRAM bandwidth allows the system designer to use lower frequency or lower power DRAM chips.

DISCLOSURE OF THE INVENTION

Technical Problem

One of the many problems that lower DRAM bandwidth is due to the fact that the bus between DRAM and SOC is shared for reads and writes. Therefore the bus needs to be flipped when switching between reads and writes. This flipping of the bus leads to large penalties and inefficient use of DRAM bandwidth. Many memory controllers today will implement a write buffer to collect writes. After some point where the number of writes inside this buffer reaches a programmable threshold, it will attempt to process all the writes outstanding inside the buffer. Since the number of writes the MC can collect is limited, it has a very short window where it can send a burst of read or write only. Thus its ability to minimize bus turnaround is limited. Accordingly, a system and method for minimizing or optimizing DRAM bus switching between reads and writes using LLC is needed.

Solution to Problem

Accordingly, embodiments of the present disclosure include a system and method for optimizing DRAM bus switching between reads and writes. In an embodiment, a current direction counter may be used to keep track of a credit value that the system has remaining in a particular direction (read or write) before the DRAM bus should be switched to the opposite direction. The current direction counter may be decremented upon the occurrence of a particular transaction or event, such as sending a read or write transaction via the bus, blocking a pending read or write transaction which is stored in a queue, or allowing the DRAM bus to sit idle due to a lack of pending transactions for the current bus direction.

An embodiment of a method of the present disclosure includes sending one of a plurality of first type requests from a first type queue to the second memory via the memory bus if a direction setting of the memory bus is in a first direction corresponding to the first type request; decrementing a current direction credit count by a first type transaction decrement value assigned for sending a first type request; if the decremented current direction credit count is greater than zero, sending another one of the plurality of first type requests from the first type queue to the second memory via the memory bus and decrementing the current direction credit count again by the first type transaction decrement value; and if the decremented current direction credit count is zero, switching the direction setting of the memory bus to a second direction corresponding to a second type request and resetting the current direction credit count to a predefined second type initial value.

An embodiment of a system of the present disclosure includes a first memory unit; a second memory unit in communication with the first hardware unit via the memory bus; and memory hardware configured with logic for: sending one of a plurality of first type requests from a first type queue to the second memory unit via the memory bus if a direction setting of the memory bus is in a first direction corresponding to the first type request; decrementing a current direction credit count by a first type transaction decrement value assigned for sending a first type request; if the decremented current direction credit count is greater than zero, sending another one of the plurality of first type requests from the first type queue to the second memory unit via the memory bus and decrementing the current direction credit count again by the first type transaction decrement value; and if the decremented current direction credit count is zero, switching the direction setting of the memory bus to a second direction corresponding to a second type request and resetting the current direction credit count to a predefined second type initial value.

An embodiment of non-transitory computer readable medium of an embodiment of the present invention includes a machine-readable non-transitory medium having stored thereon machine-executable instructions for: sending one of a plurality of first type requests from a first type queue to the second memory via the memory bus if a direction setting of the memory bus is in a first direction corresponding to the first type request; decrementing a current direction credit count by a predefined first type transaction decrement value assigned for sending a first type request; if the decremented current direction credit count is greater than zero, sending another one of the plurality of first type requests from the first type queue to the second memory via the memory bus and decrementing the current direction credit count again by the predefined first type transaction decrement value; and if the decremented current direction credit count is zero, switching the direction setting of the memory bus to a second direction corresponding to a second type request and resetting the current direction credit count to a predefined value.

Advantageous Effects of Invention

One embodiment of the present invention provides an efficient optimizing switching of a DRAM bus using LLC.

BRIEF DESCRIPTION OF DRAWINGS

FIGS. 2(b) and 2(c) are tables showing values associated with an example of the memory system according to the embodiment depicted in FIG. 2(a).

MODE FOR THE INVENTION

In the following detailed description, reference is made to the accompanying drawing figures which form a part hereof, and which show by way of illustration specific embodiments of the present invention. It is to be understood by those of ordinary skill in this technological field that other embodiments may be utilized, and that structural, electrical, as well as procedural changes may be made without departing from the scope of the present invention. Wherever possible, the same reference numbers will be used throughout the drawings to refer to the same or similar parts.

Figure 1:
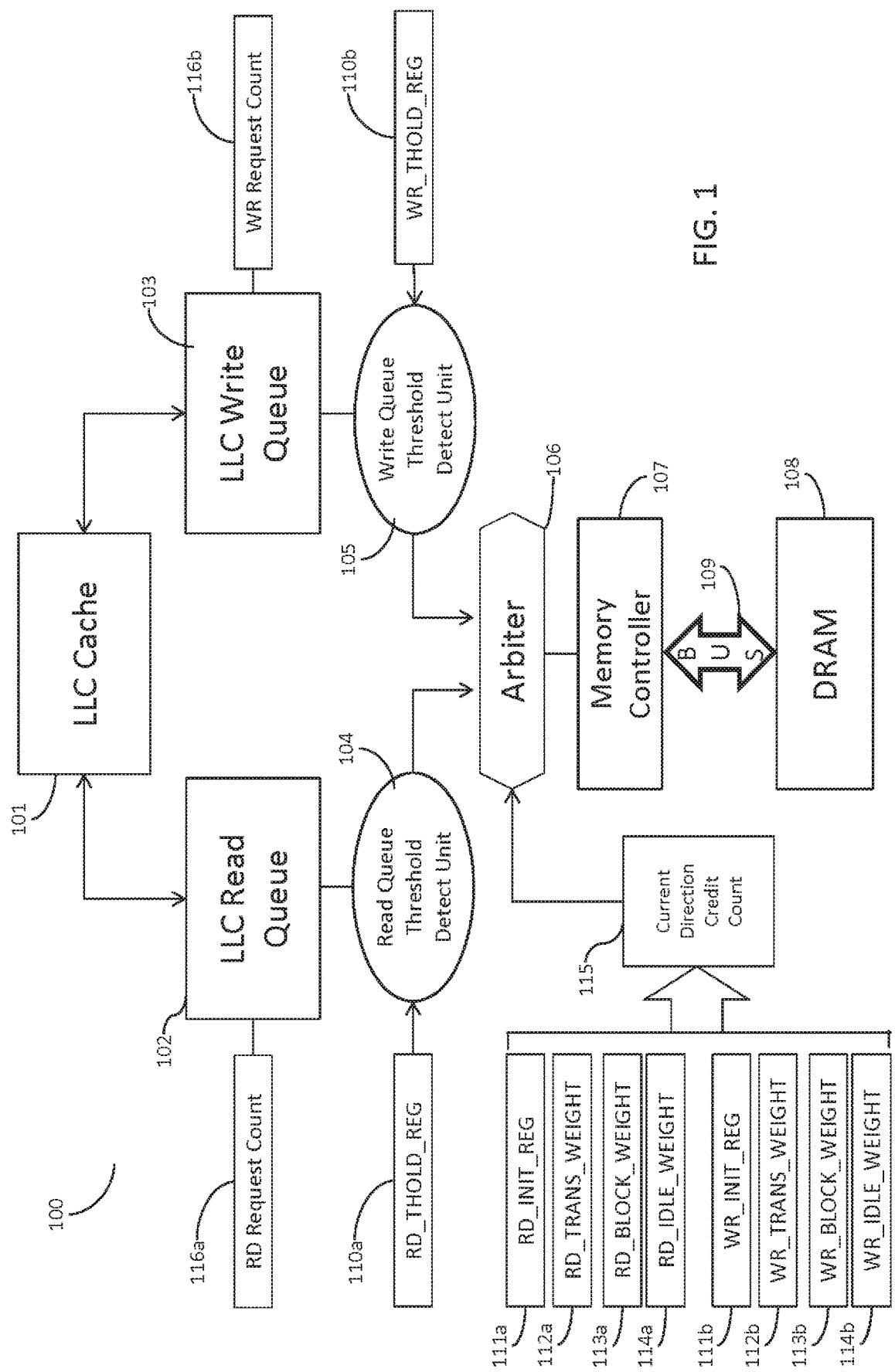
FIG. 1 is a block diagram of a memory system for optimizing DRAM bus switching according to an embodiment of the present disclosure.

Referring to FIG. 1, a simplified block diagram of a system 100 for managing DRAM bus switching is depicted. The system 100 includes an LLC cache 101 in communication with main memory, or DRAM 108 via a DRAM bus 109 and memory controller 107. Bus 109 may be shared between read transactions and write transactions. Thus, the bus 109 is only able to transmit one type of transaction at a time and a direction of the bus 109 needs to be flipped in order to switch between read and write to DRAM 108. Bandwidth of bus 109 is precious and one of the ways to optimize this is avoid frequent read and write bus turn-arounds. Since the bus 109 is shared between read and writes, the penalty for switching between read and write is high leading to latency and low bandwidth.

The system 100 further includes an LLC read queue 102 and an LLC write queue 103. The LLC read queue 102 is configured to store pending read requests which need to be sent to DRAM 108 and the LLC write queue 103 is configured to store pending write requests which need to be sent to DRAM 108. In some embodiments, the LLC read queue 102 and LLC write queue 103 may be implemented as a linked list, an array, a queue, a stack, or any other appropriate data structure to store the information. The LLC read queue 102 may include or be coupled to a read queue threshold detection unit 104 and the LLC write queue 103 may include or be coupled to a write queue threshold detection unit 105.

These threshold detection units may correspond to comparators including hardware comparators, control circuitry, or software and logic implemented in the comparator, a microprocessor, or hardware or software included with the associated queue. The read queue threshold detection unit 104 and the write queue threshold detection unit 105 may be configured to compare and detect the number of requests respectively stored in the LLC read queue 102 and the LLC write queue 103, and determine if a minimum threshold of read requests or write requests are pending to warrant switching a direction of the bus 109.

For example, a read request count 116a is associated with LLC read queue 102 and a write request count 116b is associated with LLC read queue 103. The read request count 116a and write request count 116b may correspond to registers storing the respective values for reading and updating, or they may be maintained and updated at the LLC read/write queues 102, 103, or in other cases they may be maintained and updated at the read/write queue threshold detection units 104, 105. In other embodiments, the read request count 116a and write request count 116b may be detected and obtained at runtime by the read queue threshold detection unit 104 and the write queue threshold detection unit 105.

The system 100 further includes an arbiter 106 configured to determine transactions to send through bus 109 to DRAM 108 via memory controller 107. The determination at the arbiter 106 may be based on a value of a current direction credit counter 115 which is tracked, updated, and compared after each transaction is performed via the arbiter 106 and bus 109. For example, the current direction credit counter 115 is initialized to an assigned initial value upon first setting a direction (read or write) of the bus 109, and the current direction credit counter 115 is decremented by an assigned decrement value for each occurrence of any particular transaction or event, such as a read or write request being sent to DRAM 108 via bus 109, a read request or a write request which is pending in the LLC read queue 102 or LLC write queue 103 that is prevented from being sent, and the like, as discussed further below.

Once the current direction credit counter 115 runs out (hits 0), or in some cases once it falls under a particular assigned threshold limit, the arbiter 106 is configured to switch the direction of the bus 109, reset the current direction credit counter 115 to an assigned initial value corresponding to the new direction (read or write), and to begin processing requests for that new direction from the LLC read or write queues 102, 103.

In an embodiment, a number of registers are utilized in system 100. These registers may be variable, programmable, and dynamically changed and assigned. For example, the registers may be dynamically changed based on current system requirements, requirements or priorities of a particular application or file being executed, and the like.

Register 110a, RD_THOLD_REG, may be used to store a value corresponding to a minimum number of read requests and register 110b, WR_THOLD_REG, may be used to store a value corresponding to a minimum number of write requests. These registers will indicate the minimum number of each type of request required before the arbiter will change the direction of the bus 109.

Register 111a, RD_INIT_REG, may be used to store a value corresponding to an initial value setting for the current direction counter 115 in the read direction. This represents the desired number of read requests which are to be sent by the arbiter in consecutive read transactions, otherwise referred to as a burst. Register 111b, WR_INIT_REG, may be used to store a value corresponding to an initial value setting for the current direction counter 115 in the write direction. This represents the desired number of write requests which are to be sent by the arbiter in consecutive write transactions, otherwise referred to as a burst.

Register 112a, RD_TRANS_WEIGHT, may be used to store a value corresponding to a weight to assign for each read request sent to DRAM 108 via bus 109. This represents a multiplier value used to decrement the current direction credit counter every time a read request is sent via the bus 109, thus a higher number represents that each read request may be lower in priority at the time since the current direction credit counter will be decremented at a faster rate per read request—leading to faster switching to the write direction.

Register 112b, WR_TRANS_WEIGHT, may be used to store a value corresponding to a weight to assign for each write request sent to DRAM 108 via bus 109. This represents a multiplier value used to decrement the current direction credit counter every time a write request is sent via the bus 109, thus a higher number represents that each write request may be lower in priority at the time since the current direction credit counter will be decremented at a faster rate per write request—leading to faster switching to the read direction.

The RD_TRANS_WEIGHT 112a and WR_TRANS_WEIGHT 112b registers may be weighted based on a sector count involved in each performed transaction. Thus, if a particular transaction involves multiple sectors of data which is sent over the bus 109, the RD_TRANS_WEIGHT 112a and WR_TRANS_WEIGHT 112b registers may be multiplied by the number of sectors to compensate for the amount of sectors serviced.

Register 113a, RD_BLOCK_WEIGHT may be used to store a value corresponding to a weight to assign for a read request stored in the LLC read queue 102 that is blocked from being sent when a particular transaction has been performed. This represents a multiplier value which is used to decrement the current direction credit counter every time a read request is available for sending from LLC read queue 102, but is not accepted. Register 113b, WR_BLOCK_WEIGHT may be used to store a value corresponding to a weight to assign for a write request stored in the LLC write queue 103 that is blocked from being sent after a particular transaction has been performed. This represents a multiplier value which is used to decrement the current direction credit counter every time a write request is available for sending from LLC write queue 103, but is not accepted.

The RD_BLOCK_WEIGHT 113a and WR_BLOCK_WEIGHT 113b registers may be weighted based on a sector count involved in each blocked transaction. Thus, if a particular blocked transaction involves multiple sectors of data which is waiting to be sent over the bus 109, the RD_BLOCK_WEIGHT 113a and WR_TRANS_WEIGHT 113b registers may be multiplied by the number of sectors to compensate for the amount of sectors being blocked.

Register 114a, RD_IDLE_WEIGHT may be used to store a value corresponding to a weight to assign for each cycle during a read burst where no further read requests are available for sending to DRAM 108. This represents a value which is used to decrement the current direction credit counter every time the arbiter is ready to send a read request, but no read requests are available. Register 114b, WR_IDLE_WEIGHT may be used to store a value corresponding to a weight to assign for each cycle during a write burst where no further write requests are available for sending to DRAM 108. This represents a value which is used to decrement the current direction credit counter every time the arbiter is ready to send a write request, but no write requests are available.

It is noted that in some embodiments, the system may be configured to count in the opposite direction toward an upper limit value instead of the lower limit value of 0. For example, in such an embodiment, the current direction credit counter may always be reset to an initial value of 0, and the INIT_REG values may instead correspond to RD_MAX_REG and WR_MAX_REG values which set upper maximum limits for each direction. Thus, in such embodiments, the current direction credit count will be adjusted by incrementing it by the register values above for transactions sent, transactions blocked, idle cycles, and the like, and the direction will be switched when the current direction credit count reaches or exceeds the MAX_REG values for the corresponding direction.

The above registers will be accessed and utilized to adjust the current direction credit count 115 after any transaction to allow for optimal switching of the direction of bus 109 for sending read or write requests to DRAM 108. Also as mentioned, the registers may be variable and dynamically set to optimize the memory bus according to desired settings, system requirements, or particular types of applications or files being executed by affecting the decrement rate of the current direction credit count which triggers a bus switch.

For example, registers RD_THOLD_REG 110a, RD_INIT_REG 111a and WR_THOLD_REG 110b, WR_MIT_REG 111b may be dynamically changed in conjunction with each other to obtain an optimal bandwidth efficiency versus latency requirement based on the system requirement at a particular time. For example, assigning a large RD_INIT_REG 110a value would lead to higher bandwidth (the current direction credit counter will start at a higher value, thus more read requests will be sent in a burst) at the expense of latency (it will take longer for current direction credit counter to read 0, thus it will take longer to switch bus 109 to write direction).

Conversely, assigning a low WR_THOLD_REG 110b value would lead to reduced latency (minimum number of write requests for switching the bus will be reached quicker, thus bus will be switched to write direction sooner) at the expense of bandwidth (less read requests will be able to be sent before the bus has to be switched to the write direction).

In the above example, narrowing the difference between RD_THOLD_REG 110a, RD_MIT_REG 111a and WR_THOLD_REG 110b, WR_INIT_REG 111b registers, respectively, may result in less extreme implementations and result in a more predictable performance setting for the DRAM bus 109 bandwidth.

In another example of dynamic register variation, registers RD_BLOCK_WEIGHT 113a and WR_BLOCK_WEIGHT 113b may be dynamically set to control how aggressively the arbiter 106 waits in a particular bus direction while pending requests are being blocked in the LLC read and LLC write queues 102, 103. Thus, where these registers are set to lower values, the current direction credit count will be decremented at a slower rate even where requests are being blocked, and the bus 109 will remain in that particular direction to wait for the pending requests to be processed. A low value may be dynamically set where the system requires higher DRAM bus 109 bandwidth and can tolerate increased latency.

Additionally, the above discussed registers may be used to determine minimum and maximum burst lengths in each direction. For example, RD_IDLE_WEIGHT 114a and WR_IDLE_WEIGHT 114b determine the value for decrementing the current direction credit counter 115 each time during a burst that there are no more request of a particular direction to process. Since the delta of the minimum burst length and the maximum burst length is the variability of the burst length, the RD_IDLE_WEIGHT 114a and WR_IDLE_WEIGHT 114b registers may be adjusted to control the degree of the variability dynamically.

As an example, the minimum burst length value corresponds to RD_INIT_REG 111a and WR_INIT_REG 111b. The maximum burst length value is then given by the following equations:

$$RD\_MAX = RD\_INIT\_REG - (RD\_BLOCK\_WEIGHT * \# \text{of blocked cycles}) - (RD\_IDLE\_WEIGHT * \# \text{of idle cycles}) \quad \text{[Equation 1]}$$

$$WR\_MAX = WR\_INIT\_REG - (WR\_BLOCK\_WEIGHT * \# \text{of blocked cycles}) - (WR\_IDLE\_WEIGHT * \# \text{of idle cycles}). \quad \text{[Equation 2]}$$

In some embodiments of the present disclosure, certain read or write requests may take priority over all other pending requests and the current direction credit count 115 may be overridden. For example, when a demand write request is received, which is a result of an eviction at the LLC cache 101 where data now needs to be written to DRAM 108, the system 100 may detect the demand write and bypass any requirement regarding the write queue threshold or current direction credit count 115. The demand write request may be processed and sent to DRAM 108 via bus 109 by arbiter 106 as soon as it is received.

In another embodiment, a request which is required to be performed within some desired time latency, otherwise referred to as isochronous requests, may be given high priority similar to demand writes. Isochronous requests may occur frequently when executing time-restricted media applications such as audio and video decoding and playback. Isochronous requests may be given high priority similar to demand writes such that it is processed and sent to bus 109 upon detection.

In yet another embodiment, the system 100 may include an additional register to track the existence of a high priority request, typically a read request. Register HP_RD_PRI_EN may indicate that a high priority read priority is enabled, indicating to arbiter 106 that a high priority read request has been issued which is to override the current direction credit count and threshold requirements of the bus switching system discussed above. The arbiter 106 may accordingly service the high priority read request immediately and send the request to DRAM 108 via bus 109.

In the above embodiments, if the current bus direction does not match the priority requests such as a direction of the demand write (write), isochronous request (read), or high priority read request (read), the arbiter 106 may be configured to immediately switch the direction of bus 109 to perform the priority request. After servicing the priority transaction, the arbiter 106 may be configured to resume the read/write request processing where it left off, returning to the same current direction credit count 115 value and bus 109 direction.

In other embodiments, the arbiter 106 may simply start anew, leaving the bus 109 in the same direction as the serviced priority transaction and resetting the current direction credit count 115 to the appropriate RD_INIT_REG or WR_INIT_REG. In yet other embodiments, the arbiter 106 may be configured to restart in a default direction each time after servicing the priority transaction, such as the read direction or the write direction along with resetting the current direction credit count 115 value accordingly.

Figure 2A:
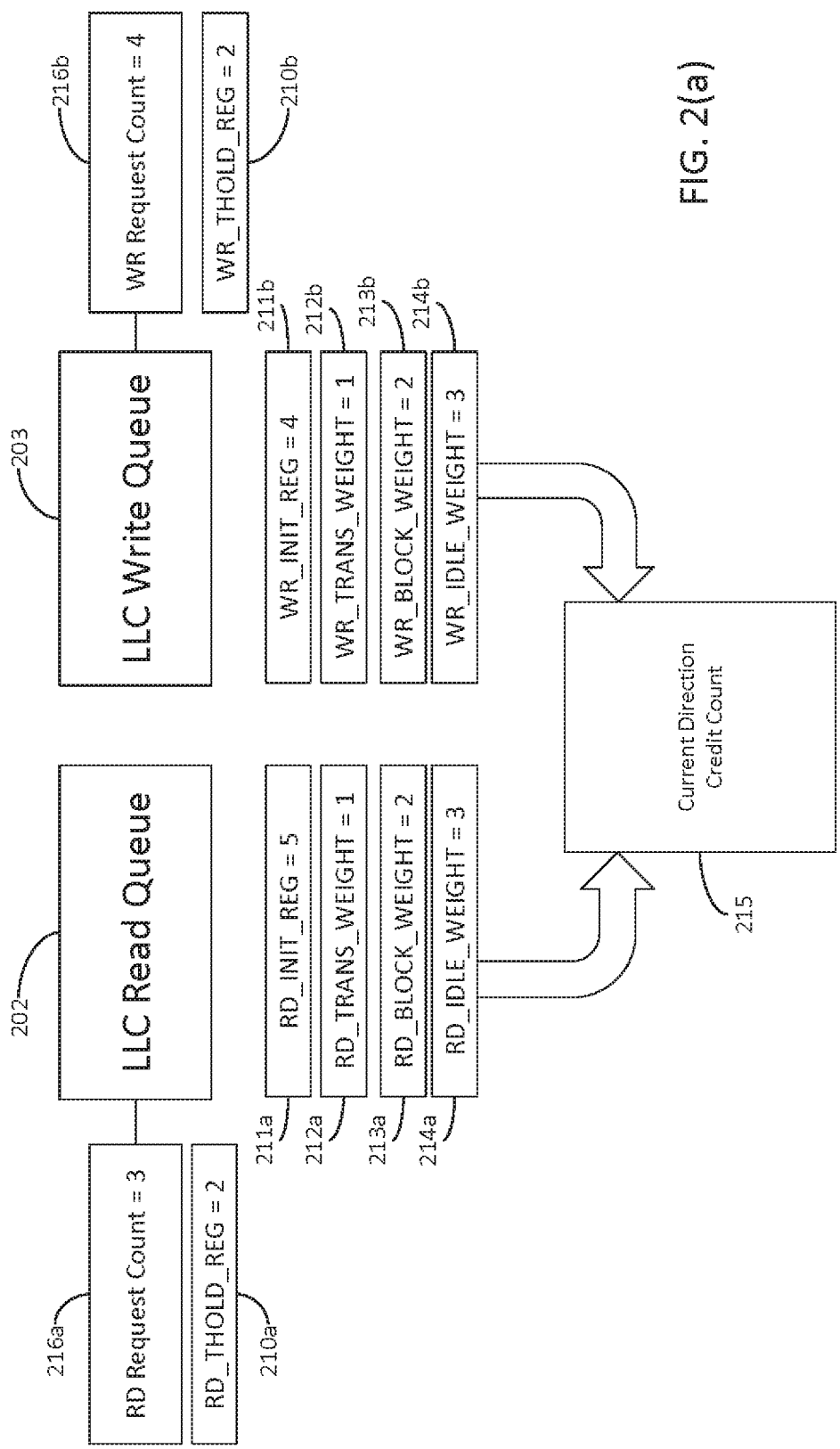
FIG. 2(a) is a block diagram showing an example of values associated with a memory system according to an embodiment of the present disclosure.

Referring now to FIG. 2(a), a graphic illustration of an initial implementation of the memory management system is depicted. It is noted that FIG. 2(a) is intended to be a graphic illustration of the values associated with some of the aspects discussed in FIG. 1 and is not intended to be a schematic representation corresponding to FIG. 1. Thus, any line or arrow connectors are intended to merely indicate contributing factors and associations in a system or method performing the operations discussed further below. The omission of any aspects discussed with respect to FIG. 1 is not to be construed as limiting with respect to the discussion of FIG. 2(a).

As shown in FIG. 2(a), the LLC read queue 202 currently has 3 read requests, indicated by RD request count 216a, and the LLC write queue 203 currently has 4 write requests, indicated by WR request count 216b. The minimum threshold values are set to 2 for read, shown at RD_THOLD_REG 210a, and set to 2 for write, shown at WR_THOLD_REG 210b. The register values for read 211a-214a are set as follows: RD_INIT_REG=5; RD_TRANS_WEIGHT=1; RD_BLOCK_WEIGHT=2; and RD_IDLE_WEIGHT=1. The register values for write 211b-214b are set as follows: WR_INIT_REG=4; WR_TRANS_WEIGHT=1; WR_BLOCK_WEIGHT=2; and WR_IDLE_WEIGHT=1.

The register values may be used to maintain and update the current direction credit count 215 as transactions are processed by the arbiter (not depicted) and sent via the bus (not depicted).

Turning now to FIG. 2(b), an example of 10 cycle operations at an embodiment of the system is shown. The first column shows a time (t) value, corresponding to a clock cycle, each of which corresponds to a particular transaction, shown in the second column. The third column CDC represents the value of the current direction credit count at time t, and the fourth column WR/RD Request count represents the number of read or write requests in their respective LLC Read Queue or LLC Write Queue, as indicated by (RD) or (WR). The last column Bus Direction represents a current direction setting of the DRAM bus.

As shown, at t=0, the direction is set to RD, either by a predefined setting, default, or current memory access requirement. At t=0, CDC is set to 5 based on RD_INIT_REG which has a value of 5, and RD request count is at 3 (see FIG. 2(a)).

At the first clock cycle t=1, the first read request is sent to DRAM via the bus. CDC is decremented by RD_TRANS_WEIGHT (1) for an updated CDC value of 4. As one read request has been serviced from the LLC Read Queue, the RD Request Count is now at 2. Bus Direction remains at RD.

At t=2, a next read request in the LLC Read Queue is blocked from being sent due to the first read request being serviced. This may be due to the memory controller 107 (of FIG. 1) being busy processing the first read request at t=1. For example, a buffer of memory controller 107 may be full and thus unable to accept any additional transaction requests until buffer space is cleared. Thus, at t=2, a read request is blocked and CDC is decremented based on RD_BLOCK_WEIGHT (2) for an updated CDC value of 2. In this example, it is assumed that all read and write requests are for one sector, therefore the BLOCK_WEIGHT and IDLE_WEIGHT registers are not sector weighted. Since no read requests were serviced, RD request count remains at 2, and Bus Direction remains at RD.

At t=3, the next read request in the LLC Read Queue is sent to DRAM via the bus. CDC is decremented by RD_TRANS_WEIGHT (1) for an updated CDC value of 1. As one read request has been serviced from the LLC Read Queue, the RD Request Count is now at 1. Bus Direction remains at RD.

At t=4, a next read request in the LLC Read Queue is blocked from being sent due to the previous read request being serviced. Thus, at t=4, a read request is blocked and CDC is decremented based on RD_BLOCK_WEIGHT (2) for an updated CDC value of 0 (CDC value is non-negative). Since no read requests were serviced, RD request count remains at 1, and Bus Direction remains at RD.

At this point, the arbiter may detect that CDC is now at 0. This triggers a comparison of the current WR Request Count 216b in the LLC Write Queue 203 to check if it is greater than or equal to WR_THOLD_REG (2). Since WR Request Count (4) is currently greater than WR_THOLD_REG, arbiter will switch the direction of the bus to WR, and begin processing write requests from the LLC Write Queue 203.

Thus, at t=5, bus direction is set to WR and CDC is reset to WR_INIT_REG (4). Since there are 4 pending write requests, WR Request Count 216b is currently at 4.

At t=6, the first write request is sent to DRAM via the bus. CDC is decremented by WR_TRANS_WEIGHT (1) for an updated CDC value of 3. As one write request has been serviced from the LLC Write Queue 203, the WR Request Count is now at 3. Bus Direction remains at WR.

At t=7, a next write request in the LLC Write Queue 203 is blocked from being sent due to the first write request being serviced. Thus, at t=7, a write request is blocked and CDC is decremented based on WR_BLOCK_WEIGHT (2) for an updated CDC value of 1. Since no write requests were serviced, WR request count remains at 3, and Bus Direction remains at WR.

At t=8, the next write request in the LLC Write Queue is sent to DRAM via the bus. CDC is decremented by WR_TRANS_WEIGHT (1) for an updated CDC value of 0. As one write request has been serviced from the LLC Write Queue, the WR Request Count is now at 2. Bus Direction remains at WR.

At this point, arbiter again detects that CDC is 0. This triggers a comparison of the current RD Request Count 216a in the LLC Read Queue 202 to check if it is greater than or equal to RD_THOLD_REG (2). It is assumed for the purposes of this example that no additional read or write requests are incoming during t=1-10, and thus RD Request Count remained at 1. However, one of ordinary skill in the art will appreciate that the embodiments of the present disclosure account for constantly changing values in at least RD/WR Request Counts 216a, 216b. Continuing the example, since RD Request Count (1) is less than RD_THOLD_REG, arbiter will not switch the direction of the bus, and will continue processing write requests from the LLC Write Queue 203 with the bus direction remaining at WR.

At t=9, a next write request in the LLC Write Queue 203 is blocked from being sent due to the previous write request being serviced. Thus, at t=9, a write request is blocked and CDC is decremented (if greater than 0) based on WR_BLOCK_WEIGHT (2), and thus CDC remains at 0. The arbiter may again perform a check of RD Request Count (which remains at 1 for our example, so bus direction is not switched again). Since no write requests were serviced, WR request count remains at 1, and Bus Direction remains at WR.

At t=10, the next write request in the LLC Write Queue is sent to DRAM via the bus. CDC is decremented by WR_TRANS_WEIGHT (1), and CDC value remains at 0. As one write request has been serviced from the LLC Write Queue, the WR Request Count is now at 0. Bus Direction remains at WR.

As discussed, this example assumes no further incoming read or write requests, which is unlikely in a real world setting. However, when CDC is found to be 0, arbiter may be configured to switch the bus to the opposite direction if the opposite direction work queue is non-zero, despite the work queue not meeting the corresponding THOLD_REG value to prevent against wasted idle cycles while work entries in the opposite direction queue go unserviced. For example, the system may also include a maximum idle value or register which sets a maximum number of idle cycles before the bus is switched to the opposite direction, regardless of whether the work queue count in the opposite direction meets the THOLD_REG value.

Referring now to FIG. 2(c), the example of FIG. 2(b) is continued, however with the caveats, for the sake of example, that WR_MIT_REG=8, and between t=5 and t=12 three new read requests have been issued and loaded into LLC Read Request Queue.

Thus starting from t=5 (t=1-4 are the same as in FIG. 2(b)), bus direction is set to WR and CDC is reset to 8. There are 4 write requests in LLC Write Request Queue as shown in FIG. 2(a).

At t=6, the first write request is sent to DRAM via the bus. CDC is decremented by WR_TRANS_WEIGHT (1) for an updated CDC value of 7. As one write request has been serviced from the LLC Write Queue 203, the WR Request Count is now at 3. Bus Direction remains at WR.

At t=7, a next write request in the LLC Write Queue 203 is blocked from being sent due to the first write request being serviced. Thus, at t=7, a write request is blocked and CDC is decremented based on WR_BLOCK_WEIGHT (2) for an updated CDC value of 5. Since no write requests were serviced, WR request count remains at 3, and Bus Direction remains at WR.

At t=8, the next write request in the LLC Write Queue is sent to DRAM via the bus. CDC is decremented by WR_TRANS_WEIGHT (1) for an updated CDC value of 4. As one write request has been serviced from the LLC Write Queue, the WR Request Count is now at 2. Bus Direction remains at WR.

At t=9, the next write request in the LLC Write Queue is sent to DRAM via the bus (the memory controller is able to service these consecutive write requests). CDC is decremented by WR_TRANS_WEIGHT (1) for an updated CDC value of 3. As one write request has been serviced from the LLC Write Queue, the WR Request Count is now at 1. Bus Direction remains at WR.

At t=10, the next write request in the LLC Write Queue is sent to DRAM via the bus. CDC is decremented by WR_TRANS_WEIGHT (1) for an updated CDC value of 2. As one write request has been serviced from the LLC Write Queue, the WR Request Count is now at 0. Bus Direction remains at WR.

At t=11, since WR Request Count is 0, there are no more work entries in the LLC Write Queue 203. Thus, t=11 results in an idle cycle where no transaction is serviced and no data is sent to bus 109. Accordingly, CDC is decremented based on WR_IDLE_WEIGHT (3) for an updated CDC value of 0. If the system is dynamically configured to be aggressive in waiting for additional write requests despite idle cycles, WR_IDLE_WEIGHT may be set to a low number, such as 1, which will slowly decrement CDC despite additional idle cycles.

Since CDC is 0, arbiter may switch the direction of the bus to RD at t=12. As mentioned above, for the purposes of discussion of FIG. 2(c), it was assumed that between t=5 and t=12 three new read requests were issued and loaded into LLC Read Request Queue, resulting in RD Request Count being at 4, which is found to be greater than RD_THOLD_REG (2). Therefore, the bus direction is set to RD, and CDC is reset to 5 based on RD_MIT_REG.

At t=13, the next read request in the LLC Read Queue is sent to DRAM via the bus. CDC is decremented by RD_TRANS_WEIGHT (1) for an updated CDC value of 4. As one read request has been serviced from the LLC Read Queue, the RD Request Count is now at 3. Bus Direction remains at RD.

As shown in the examples discussed above with respect to FIGS. 2(b) and 2(c), the system may utilize the registers 111a-114a and 111b-114b (of FIG. 1) to maintain and update current direction credit count 115 according to each transaction at each clock cycle. In this way, bursts of reads and writes may be performed while considering each transaction's cost to the system represented by decrement values to the current direction credit count 115 value.

Figure 3:
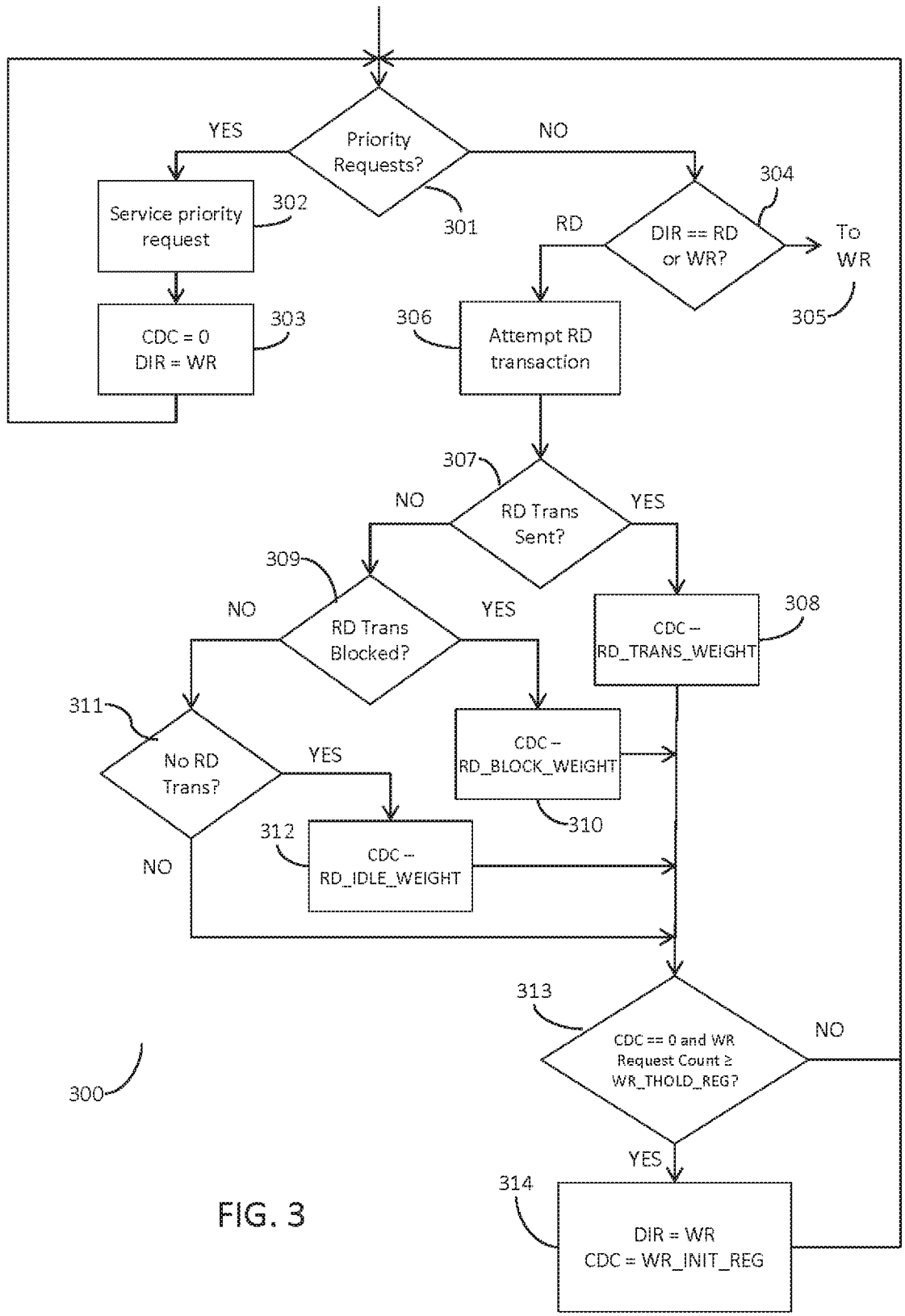
FIG. 3 is a flowchart of a process for optimizing DRAM bus switching according to an embodiment of the present disclosure.

Referring now to FIG. 3, a flowchart 300 is depicted showing a process according to an embodiment of the present disclosure. In an embodiment, the process shown in FIG. 3 represents operations performed by an arbiter of the system as previously discussed.

The process is initiated at 300 wherein at particular clock cycle, a check is performed to determine whether there are any priority requests to be serviced. As previously discussed, this may include demand write requests, or read requests that are indicated as high priority, such as isochronous requests and the like, by register HP_RD_PRI_EN. If there are high priority requests the process proceeds to 302 where the high priority request is serviced. Thereafter, the system may be configured to resume a previous process with previous CDC and register values, or the process may proceed to an operation such as 303, where the system is reset, CDC is set to 0, and the bus direction is set to a default or desired direction, such as in 303 where bus direction is set to WR. The process then recurs beginning at 301.

If the determination at 301 does not find any high priority requests, the process continues at 304 where the current bus direction is detected. If the current bus direction is WR, it proceeds to the write direction operations 305. For the purposes of this example, the write direction operations 305 are omitted, however one of ordinary skill in the art will understand that the write direction operations at 305 are similar to the read direction operations which are discussed with respect to FIG. 3.

Accordingly, if the current bus direction is RD, a next RD transaction is attempted at 306. This may correspond to attempting to perform a next read request (if any exist) from the LLC Read Queue. The attempt to perform the next read request may result in a successful transaction, a read block (due to a previous pending transaction), or an idle cycle because there are no more read requests in the LLC Read Queue. Accordingly, the process performs a check at 307 whether a RD transaction was sent. If yes (RD transaction was sent), the CDC must be decremented by the value at register RD_TRANS_WEIGHT at 308. Also as previously discussed, 308 may further include a multiplier for RD_TRANS_WEIGHT to take into account sector size for the RD transaction that was sent.

If no RD transaction was sent at 306, the process will continue to 309 where it is determined whether the RD transaction was blocked. If yes (RD transaction was blocked), the CDC must be decremented by the value at register RD_BLOCK_WEIGHT at 310. Also as previously discussed, 310 may further include a multiplier for RD_BLOCK_WEIGHT to take into account sector size for the RD transaction that was blocked.

If no RD transaction was sent or blocked, the process continues to 311 where it is determined whether the cycle was idle due to no read requests being in the LLC Read Queue. If yes (idle cycle), CDC must be decremented by the value at register RD_IDLE_WEIGHT at 312. A NO result at 311 (no RD transaction sent, no RD transaction blocked, and no idle cycle), while unlikely, will return to step 313.

All operations decrementing CDC at 308, 310, 312 will proceed to 313 which performs a check for whether CDC is equal to 0 and the number of write requests in the LLC Write Queue (WR Request Count) is greater than or equal to WR_THOLD_REG.

If this results in YES, the bus direction needs to be switched to the write direction. Accordingly, at 314, the bus direction is set to WR and CDC is reset to WR_MIT_REG. Thereafter, the process recurs to 301.

If either CDC is not 0 or if WR Request Count is less than WR_THOLD_REG at 313, the bus direction is to remain at RD. Accordingly, from 313, the process simply recurs to 301 with the newly decremented CDC value and the bus direction still remaining set to RD.

As discussed, FIG. 3 merely shows an example of a process according to an embodiment of the present disclosure, and not all aspects are depicted or discussed. For example, the process may further include a check to see if there are any pending write requests if an idle cycle is detected at 311. If so, the process may escape, automatically set bus direction to WR, set CDC to WR_MIT_REG and return to 301 to begin processing write requests in order to reduce latency and not wait until CDC decrements down to 0 despite multiple idle cycles.

Figure 4:
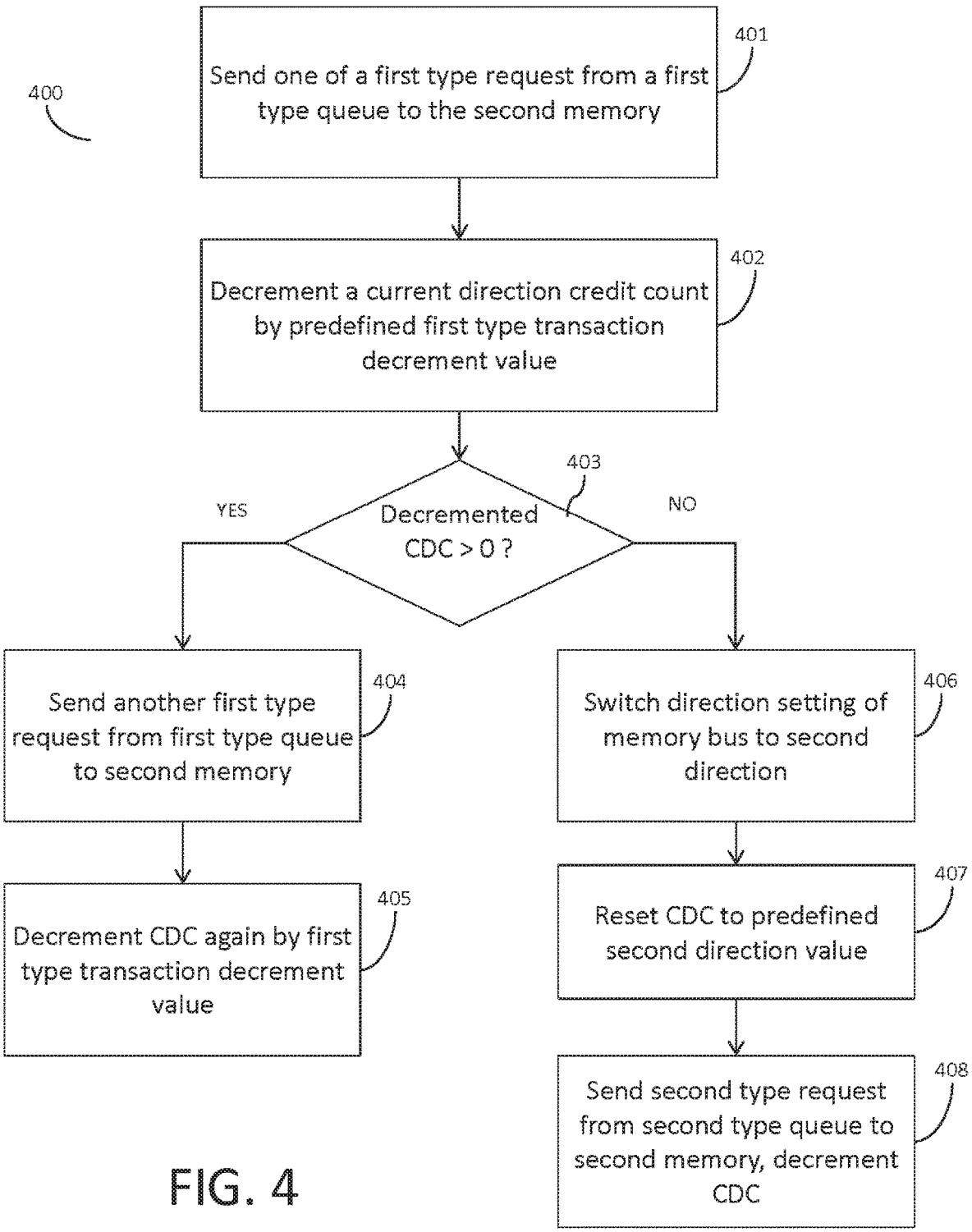
FIG. 4 is a flowchart of a process for optimizing DRAM bus switching according to another embodiment of the present disclosure.

FIG. 4 is a simplified flowchart 400 showing a method of managing a memory bus according to an embodiment of the present disclosure. For example, the method may include sending one of a plurality of first type requests from the a first type queue to the second memory via the memory bus if a direction setting of the memory bus is in a first direction corresponding to the first type request at block 401, and decrementing a current direction credit count by a predefined first type transaction decrement value assigned for sending a first type request and block 402.

The method further comprises determining if the decremented current direction credit count is greater than zero at determination 403, and if yes, sending another one of the plurality of first type requests from the first type queue to the second memory via the memory bus at block 404. Afterwards, the method includes decrementing the current direction credit count again by the predefined first type transaction decrement value at block 405. If the decremented current direction credit count is zero at determination 403, the method includes switching the direction setting of the memory bus to a second direction corresponding to a second type request at 406, and resetting the current direction credit count to a predefined value at block 407.

An embodiment of the method may further include wherein if the decremented current direction credit count is zero at determination 403, sending one of a plurality of second type requests from a second type queue to the second memory bus and decrementing the current direction credit count by a predefined second type transaction decrement value assigned for sending a second type request at block 408.

As discussed, a system and method for optimizing DRAM bus switching using LLC of the present disclosure utilizes a current direction credit counter to keep track of a credit value that the system has remaining in a particular direction (read or write) before the DRAM bus should be switched to the opposite direction. The current direction counter may be decremented upon the occurrence of a particular transaction or event, such as sending a read or write transaction via the bus, blocking a pending read or write transaction which is stored in a queue, or allowing the DRAM bus to sit idle due to a lack of pending transactions for the current bus direction. These and other aspects of the present disclosure may allow for efficient management of a memory bus of the system by minimizing or optimizing bus switching using LLC.

The various components, elements, devices, modules, terminals, methods, and the like discussed herein, including LLC cache, LLC read queue, LLC write queue, registers, arbiter, memory bus, memory controller, read and write queue threshold detection units, main memory, and the like, may be implemented by one or more hardware components or units, circuitry, or on a computer by execution of software comprising machine instructions read from non-transitory computer-readable medium. In certain embodiments, the above systems and methods maybe implemented via one or a combination of hardware and software, and hardware implementing one or more aspects of this disclosure may be implemented using a single hardware component, including hardware comprising or configured with logic, circuitry, hardware processor units, cmos gates, hardware memory devices, hardware memory controllers, and the like.

For a software implementation, certain embodiments described herein may be implemented with separate software modules, such as procedures and functions, each of which perform one or more of the functions and operations described herein. The software codes can be implemented with a software application written in any suitable programming language and may be stored in memory and executed by a controller or processor.

The foregoing disclosed embodiments and features are merely exemplary and are not to be construed as limiting the present invention. The present teachings can be readily applied to other types of apparatuses and processes. The description of such embodiments is intended to be illustrative, and not to limit the scope of the claims. Many alternatives, modifications, and variations will be apparent to those skilled in the art.

The invention claimed is:

1. A method for managing a memory bus between a first memory and a second memory, the method comprising:
    sending one of a plurality of first type requests from a first type queue to the second memory via the memory bus based upon a direction setting of the memory bus being in a first direction corresponding to the first type request;
    decrementing a current direction credit count by a first type transaction decrement value assigned for sending a first type request;
    based upon the decremented current direction credit count being greater than zero, sending another one of the plurality of first type requests from the first type queue to the second memory via the memory bus and decrementing the current direction credit count again by the first type transaction decrement value;
    based upon the decremented current direction credit count being zero, switching the direction setting of the memory bus to a second direction corresponding to a second type request and resetting the current direction credit count to a predefined second type initial value,
    a rate of the current direction credit count decrement is changed depending on a bandwidth to tolerate latency, and
    based upon a request, which is required to be performed within some desired time latency which occurs when executing a time-restricted media application, being received:
    bypassing any requirement regarding the current direction credit count,
    processing the request, and
    sending the request to the second memory via the memory bus.

2. The method of claim 1, wherein based upon the decremented current direction credit count being zero, the method further comprises comparing a minimum second type threshold value to a number of pending second type requests in a second type queue,
    wherein the direction setting of the memory bus is switched to the second direction and the current direction credit count is reset only if the number of pending second type requests is greater than the minimum second type threshold value.

3. The method of claim 2, wherein based upon the decremented current direction credit count being zero and the number of pending second type requests being greater than the minimum second type threshold value, the method further comprises:

sending one of the pending type requests from the second type queue to the second memory bus; and decrementing the current direction credit count by a second type transaction decrement value assigned for sending a second type request.

4. The method of claim 1, wherein the first type transaction decrement value used to decrement the current direction credit count is multiplied by a sector size weight value corresponding to a size of the first type request sent to the second memory.

5. A method for managing a memory bus between a first memory and a second memory, the method comprising:

attempting to send one of a plurality of first type requests from a first type queue to the second memory via the memory bus based upon a direction setting of the memory bus being in a first direction corresponding to the first type request;

decrementing a current direction credit count by a first type block decrement value when the first type request is blocked from being sent to the second memory;

based upon the decremented current direction credit count being greater than zero, attempting to send the first type request again from the first type queue to the second memory via the memory bus;

based upon the decremented current direction credit count being zero, switching the direction setting of the memory bus to a second direction corresponding to a second type request and resetting the current direction credit count to a predefined second type initial value, a rate of the current direction credit count decrement is changed depending on a bandwidth to tolerate latency, and based upon a request, which is required to be performed within some desired time latency which occurs when executing a time-restricted media application, being received:

bypassing any requirement regarding the current direction credit count, processing the request, and sending the request to the second memory via the memory bus.

6. The method of claim 5, wherein based upon the decremented current direction credit count being zero, the method further comprises comparing a minimum second type threshold value to a number of pending second type requests in a second type queue, wherein the direction setting of the memory bus is switched to the second direction and the current direction credit count is reset only if the number of pending second type requests is greater than the minimum second type threshold value.

7. The method of claim 6, wherein based upon the decremented current direction credit count being zero and the number of pending second type requests is greater than the minimum second type threshold value, the method further comprises:

sending one of the pending type requests from the second type queue to the second memory bus; and decrementing the current direction credit count by a second type transaction decrement value assigned for sending a second type request.

8. The method of claim 5, wherein the first type block decrement value used to decrement the current direction credit count is multiplied by a sector size weight value corresponding to a size of the first type request that was blocked from being sent to the second memory.

9. A machine-readable non-transitory medium having stored thereon machine-executable instructions, in communication with a second memory via a memory bus, for:

sending one of a plurality of first type requests from a first type queue to the second memory via the memory bus if a direction setting of the memory bus is in a first direction corresponding to the first type request;

decrementing a current direction credit count by a predefined first type transaction decrement value assigned for sending a first type request;

if the decremented current direction credit count is greater than zero, sending another one of the plurality of first type requests from the first type queue to the second memory via the memory bus and decrementing the current direction credit count again by the predefined first type transaction decrement value;

if the decremented current direction credit count is zero, switching the direction setting of the memory bus to a second direction corresponding to a second type request and resetting the current direction credit count to a predefined value, a rate of the current direction credit count decrement is changed depending on a bandwidth to tolerate latency, and based upon a request, which is required to be performed within some desired time latency which occurs when executing a time-restricted media application, being received:

bypassing any requirement regarding the current direction credit count, processing the request, and sending the request to the second memory via the memory bus.

10. The machine-readable non-transitory medium of claim 9, further having stored thereon machine-executable instructions for:

wherein if the decremented current direction credit count is zero, comparing a minimum second type threshold value to a number of pending second type requests in a second type queue, wherein the direction setting of the memory bus is switched to the second direction and the current direction credit count is reset only if the number of pending second type requests is greater than the minimum second type threshold value.

11. The machine-readable non-transitory medium of claim 10, further having stored thereon machine-executable instructions for:

wherein if the decremented current direction credit count is zero and the number of pending second type requests is greater than the minimum second type threshold value:

sending one of the pending type requests from the second type queue to the second memory bus; and decrementing the current direction credit count by a second type transaction decrement value assigned for sending a second type request.

12. The machine-readable non-transitory medium of claim 9, wherein the first type transaction decrement value used to decrement the current direction credit count is multiplied by a sector size weight value corresponding to a size of the first type request sent to the second memory.

13. A machine-readable non-transitory medium having stored thereon machine-executable instructions, in communication with a second memory via a memory bus, for:

attempting to send one of a plurality of first type requests from a first type queue to the second memory via the memory bus if a direction setting of the memory bus is in a first direction corresponding to the first type request;

decrementing a current direction credit count by a first type block decrement value when the first type request is blocked from being sent to the second memory;

if the decremented current direction credit count is greater than zero, attempting to send the first type request again from the first type queue to the second memory via the memory bus;

if the decremented current direction credit count is zero, switching the direction setting of the memory bus to a second direction corresponding to a second type request and resetting the current direction credit count to a predefined second type initial value, a rate of the current direction credit count decrement is changed depending on a bandwidth to tolerate latency, and based upon a request, which is required to be performed within some desired time latency which occurs when executing a time-restricted media application, being received:

bypassing any requirement regarding the current direction credit count, processing the request, and sending the request to the second memory via the memory bus.

14. The machine-readable non-transitory medium of claim 13, further having stored thereon machine-executable instructions for:
wherein if the decremented current direction credit count is zero, comparing a minimum second type threshold value to a number of pending second type requests in a second type queue,
wherein the direction setting of the memory bus is switched to the second direction and the current direction credit count is reset only if the number of pending second type requests is greater than the minimum second type threshold value.

15. The machine-readable non-transitory medium of claim 14, further having stored thereon machine-executable instructions for:
wherein if the decremented current direction credit count is zero and the number of pending second type requests is greater than the minimum second type threshold value:
sending one of the pending type requests from the second type queue to the second memory bus; and
decrementing the current direction credit count by a second type transaction decrement value assigned for sending a second type request.

16. The machine-readable non-transitory medium of claim 13, wherein the first type block decrement value used to decrement the current direction credit count is multiplied by a sector size weight value corresponding to a size of the first type request that was blocked from being sent to the second memory.

17. A system for managing a memory bus, the system comprising:
a first memory unit;
a second memory unit in communication with the first memory unit via the memory bus; and
memory hardware configured with logic for:
sending one of a plurality of first type requests from a first type queue to the second memory unit via the memory bus if a direction setting of the memory bus is in a first direction corresponding to the first type request;

decrementing a current direction credit count by a first type transaction decrement value assigned for sending a first type request;

if the decremented current direction credit count is greater than zero, sending another one of the plurality of first type requests from the first type queue to the second memory unit via the memory bus and decrementing the current direction credit count again by the first type transaction decrement value;

if the decremented current direction credit count is zero, switching the direction setting of the memory bus to a second direction corresponding to a second type request and resetting the current direction credit count to a predefined second type initial value, a rate of the current direction credit count decrement is changed depending on a bandwidth to tolerate latency, and based upon a request, which is required to be performed within some desired time latency which occurs when executing a time-restricted media application, being received:

bypassing any requirement regarding the current direction credit count, processing the request, and sending the request to the second memory via the memory bus.

18. The system of claim 17, wherein the memory hardware is further configured with logic for if the decremented current direction credit count is zero, comparing a minimum second type threshold value to a number of pending second type requests in a second type queue,
wherein the direction setting of the memory bus is switched to the second direction and the current direction credit count is reset only if the number of pending second type requests is greater than the minimum second type threshold value.

19. The system of claim 18, wherein the memory hardware is further configured with logic for if the decremented current direction credit count is zero and the number of pending second type requests is greater than the minimum second type threshold value:
sending one of the pending type requests from the second type queue to the second memory bus; and
decrementing the current direction credit count by a second type transaction decrement value assigned for sending a second type request.

20. The system of claim 17, wherein the first type transaction decrement value used to decrement the current direction credit count is multiplied by a sector size weight value corresponding to a size of the first type request sent to the second memory.

21. A system for managing a memory bus, the system comprising:
a first memory unit;
a second memory unit in communication with the first memory unit via the memory bus; and
memory hardware configured with logic for:
attempting to send one of a plurality of first type requests from a first type queue to the second memory unit via the memory bus if a direction setting of the memory bus is in a first direction corresponding to the first type request;

decrementing a current direction credit count by a first type block decrement value when the first type request is blocked from being sent to the second memory unit;

if the decremented current direction credit count is greater than zero, attempting to send the first type request again from the first type queue to the second memory unit via the memory bus;

if the decremented current direction credit count is zero, switching the direction setting of the memory bus to a second direction corresponding to a second type request and resetting the current direction credit count to a predefined second type initial value, a rate of the current direction credit count decrement is changed depending on a bandwidth to tolerate latency, and based upon a request, which is required to be performed within some desired time latency which occurs when executing a time-restricted media application, being received:

bypassing any requirement regarding the current direction credit count, processing the request, and sending the request to the second memory via the memory bus.

22. The system of claim 21, wherein the memory hardware is further configured with logic for if the decremented current direction credit count is zero, comparing a minimum second type threshold value to a number of pending second type requests in a second type queue, wherein the direction setting of the memory bus is switched to the second direction and the current direction credit count is reset only if the number of pending second type requests is greater than the minimum second type threshold value.

23. The system of claim 22, wherein the memory hardware is further configured with logic for if the decremented current direction credit count is zero and the number of pending second type requests is greater than the minimum second type threshold value:

sending one of the pending type requests from the second type queue to the second memory bus; and decrementing the current direction credit count by a second type transaction decrement value assigned for sending a second type request.

24. The system of claim 21, wherein the first type block decrement value used to decrement the current direction credit count is multiplied by a sector size weight value corresponding to a size of the first type request that was blocked from being sent to the second memory.

* * * * *